United States Patent [19]
Kitaguchi et al.

[11] Patent Number: 5,296,435
[45] Date of Patent: Mar. 22, 1994

[54] CATALYST AND A METHOD OF PREPARE THE CATALYST

[75] Inventors: Shinya Kitaguchi, Himeji; Sadao Terui, Hyogo; Atsushi Nose, Himeji, all of Japan

[73] Assignee: Nippon Shokubai Co., Ltd., Osaka, Japan

[21] Appl. No.: 984,524

[22] Filed: Dec. 2, 1992

[30] Foreign Application Priority Data

Dec. 5, 1991 [JP] Japan .................. 3-321780
Mar. 23, 1992 [JP] Japan .................. 4-65165

[51] Int. Cl.$^5$ ............................. B01J 23/24
[52] U.S. Cl. ........................ 502/174; 502/241; 502/324
[58] Field of Search ............. 502/174, 241, 324; 423/219

[56] References Cited

U.S. PATENT DOCUMENTS

| | | | |
|---|---|---|---|
| 3,993,597 | 11/1976 | Stiles | 502/241 |
| 5,187,137 | 2/1993 | Terui et al. | 502/241 |

FOREIGN PATENT DOCUMENTS

| | | | |
|---|---|---|---|
| 0361385 | 4/1990 | European Pat. Off. | |
| 3003793 | 8/1981 | Fed. Rep. of Germany | 423/219 |
| 0043092 | 4/1975 | Japan | 502/174 |
| 0028592 | 3/1978 | Japan | 502/174 |
| 0136941 | 8/1982 | Japan | 423/219 |
| 61-101230 | 5/1986 | Japan | |
| 63-197524 | 8/1988 | Japan | |
| 3229645 | 10/1991 | Japan | 502/324 |

OTHER PUBLICATIONS

Database WPIL, Derwent Publications Ltd., AN 86-152770, & JP-A-61 085 969, May 1, 1986.
Database WPIL, Derwent Publications Ltd., AN, 75-50182W, & JP-A-50 043 092, Apr. 18, 1975.
Database WPIL, Derwent Publications Ltd., AN 82-82750E, & JP-4-57 136 940, Aug. 24, 1982.

*Primary Examiner*—Carl F. Dees
*Attorney, Agent, or Firm*—Oblon, Spivak, McClelland, Maier & Neustadt

[57] ABSTRACT

The catalyst according to the present invention can be utilized effectively as an ozone decomposing catalyst for catalytically decomposing to eliminate ozone contained in a gas and/or an ozone deodorizing catalyst for decomposing offensive odor ingredients contained in a gas by catalytic oxidation under the pretense of ozone, and it contains at least manganese carbonate as the essential component in the catalyst composition. Further, the catalyst contains, particularly preferably, $MnO_x$ (in which $x=1.6-2.0$) in addition to manganese carbonate and such a catalyst is obtained by applying a heat treatment to a catalyst raw material containing manganese carbonate in an oxidative atmosphere at 100°-420° C.

8 Claims, 2 Drawing Sheets

Comparative catalyst (A) calcined at 450°C

○ MnOx
● $Mn_2O_3$

Comparative catalyst (B) calcined at 550°C

● $Mn_2O_3$

CATALYST AND A METHOD OF PREPARE THE CATALYST

BACKGROUND OF THE INVENTION

1. Field of the Invention

The present invention concerns a catalyst used as an ozone decomposing catalyst for catalytically decomposing to eliminate ozone contained in a gas and/or an ozone deodorizing catalyst for catalytically oxidizing to decompose and eliminate offensive odor ingredients contained in a gas under the presence of ozone, as well as a method of preparing such a catalyst.

2. Description of the Prior Art

Since ozone has a strong oxidizing performance and converts itself into harmless oxygen when it is decomposed, it has generally been utilized in various fields with aims for deodorizing, sterilization, bleaching, reduction of COD in effluents or the like. However, since part of ozone utilized in the above-mentioned application use is released as it is, being unreacted, into atmospheric air, it may possibly cause secondary public pollution such as a photochemical smogs. Further, if an aircraft flies through the stratosphere since air containing ozone is drawn into the interior of the aircraft, it may resultant a danger of giving undesired effects on passengers and crews. Furthermore, various kinds of high voltage generation devices, for example, dry process copying machines have been used widely in recent years and ozone released from such devices, though little, may contaminate the inside of rooms and brings about an undesired situation not negligible from a circumstantial sanitary point of view.

Ozone not only gives uncomfortable feeling by its odor but also shows a strong toxicity to a human body, which attacks a respiratory organ at a concentration above a certain level and it is extremely harmful when inhaled for a long period of time even if it is in a trace amount. In view of the above, it has been demanded for the establishment of a technique for decomposing to eliminate spent ozone released from various generation sources.

As existent methods of disposing spent ozone, there have been known, for example, (I) a treating method with activated carbon, (II) a treating method by liquid chemical cleaning, (III) a treating method by thermal decomposition and (IV) a treating method with an ozone decomposing catalyst. Among them, treatment by using the ozone decomposing catalyst is considered most advantageous for the ozone decomposition since it is free from ignition or explosion danger, requires no waste water treatment and can decompose to eliminate ozone at a reduced cost.

As the ozone decomposing catalyst, manganese oxides have been well-known so far and various methods have been developed for the preparation thereof. For instance, there has been known a method of forming manganese oxides, for example, by immersing an inorganic support such as metal, asbesto or ceramic or activated carbon with a solution of manganese compound such as manganese nitrate and, subsequently, applying a heat treatment (Japanese Patent Laid Open Publication Sho 63-197524) or a method of coating manganese oxide such as an activated manganese dioxide or electrolysis manganese dioxide on a support material (Japanese Patent Laid Open Publication Sho 61-101230). However, it has been necessary to use such existent ozone decomposing catalysts by elevating temperature by heating or removing moisture since their activity is low at low temperature or the activity is reduced remarkably upon use in a highly humid condition. Further, since the performance is low only with manganese oxide, it has been used at present while enhancing the catalytic activity by adding a transition metal such as Co, Cu, Ni or Ag or a platinum group such as Pt, Pd or Rh as a cocatalyst. In particular, in recent years in which circumstantial problems have attracted an attention, it has been demanded for a catalyst having a higher activity than in the existent products also in the ozone decomposing catalyst.

On the other hand, public pollution caused by offensive odor has been closed-up as a social problem and a deodorizing technique for removing ingredients attributable to the offensive odors have been investigated from various aspects. As deodorizing methods practiced so far, there are, for example, (I) water washing, (II) chemical cleaning, (III) adsorption, (IV) direct combustion, (V) catalytic combustion and (VI) ozone oxidization, but they have merits and demerits respectively. Among them, the ozone oxidization method of disposing the offensive odor ingredients by making use of the powerful oxidizing effect of ozone is advantageous since it can be practiced at a relatively low temperature about at a room temperature and at a reduced running cost as compared with the various methods described above. However, the method involves a drawback of requiring a long and voluminous reaction zone since the rate of reaction between ozone and offensive odor ingredient in a gas phase is low. Further, since unreacted ozone is released in atmosphere, it also suffers from a drawback of causing secondary public pollution such as a photochemical smog.

As a means for overcoming the foregoing drawbacks in the ozone oxidization, there has been proposed a method of utilizing a catalyst. In this method, offensive odor ingredients are disposed through decomposition by means of a catalyst under the presence of ozone (hereinafter referred to as ozone deodorizing catalyst). According to this method, ozone reacts with the offensive odor ingredients rapidly requiring no large reaction space and the deodorizing efficiency is improved outstandingly, as well as ozone is decomposed completely to eliminate the worry that unreacted ozone is released into the atmospheric air.

For the ozone deodorizing catalyst, various techniques have been developed so far, but their effects can not be attained to a full extent depending on the working conditions. That is, there is a drawback that the activity of the catalyst is reduced in an early stage if the catalyst is used continuously for a long period of time or used under a high humidity condition. In view of the above, a catalyst having a higher activity than the existent catalyst has been demanded.

SUMMARY OF THE INVENTION

The present invention have been accomplished taking notice on the foregoing situations and the object thereof is to provide a catalyst that can be effectively utilized as an ozone decomposing catalyst or an ozone deodorizing catalyst, as well as a method useful for preparing such a catalyst.

DISCLOSURE OF THE INVENTION

The catalyst according to the present invention capable of obtaining the foregoing object has a feature in containing at least manganese carbonate as an essential component in a catalyst composition and such a catalyst can be utilized effectively as an ozone decomposing catalyst for catalytically decomposing ozone contained in a gas and/or an ozone deodorizing catalyst for catalytically oxidizing to decompose offensive odor ingredients under the presence of ozone. A particularly preferred embodiment of the catalyst contains $MnO_x$ (in which $x=1.6-2.0$) in addition to manganese carbonate. Further, a refractory inorganic oxide may be incorporated, if necessary, to the catalyst.

On the other hand, a method of preparing the catalyst according to the present invention has a feature in applying a heat treatment to a catalyst raw material containing at least manganese carbonate and, if necessary, a refractory inorganic oxide in an oxidative atmosphere at 100°–420° C.

DESCRIPTION OF THE PREFERRED EMBODIMENT

Figure 1A:
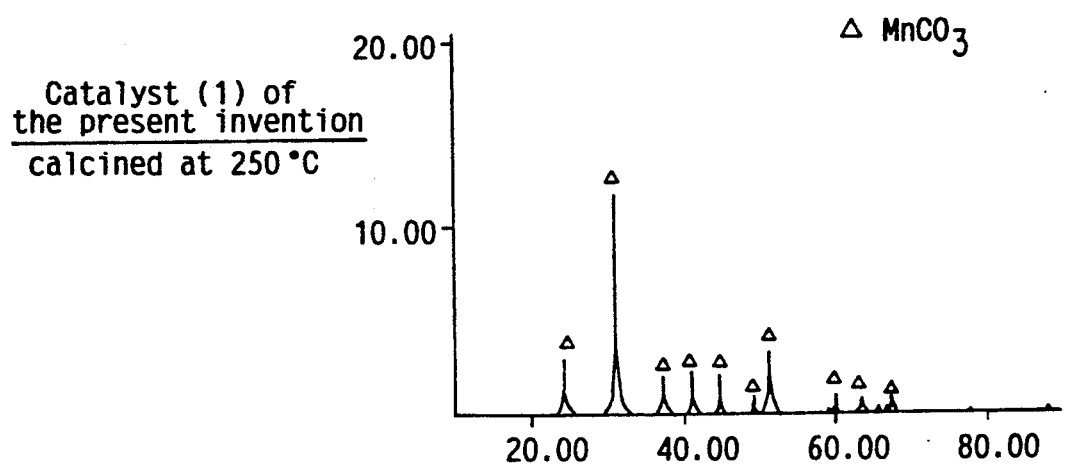
FIG. 1(a)–(d) shows measuring charts for X-ray diffractiometry for catalysts (1), (2) obtained in Examples 1, 2 as well as comparative catalysts (A), (B) obtained in Comparative Examples 1, 2 respectively.
Figure 1B:
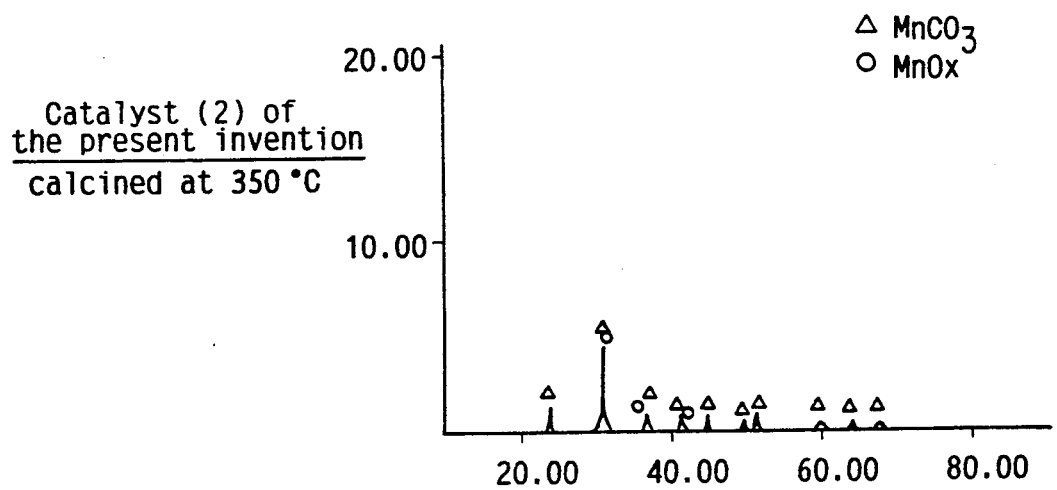
Figure 1C:
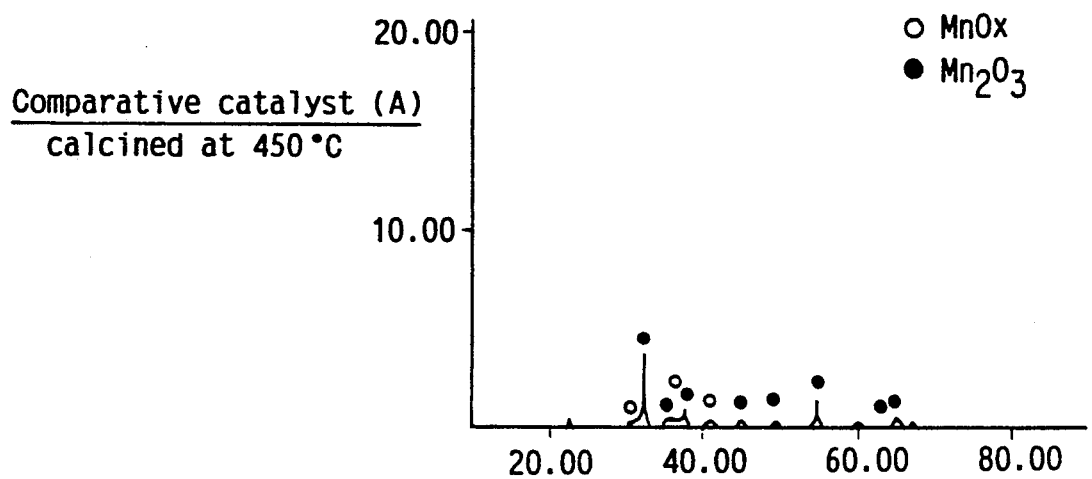
Figure 1D:
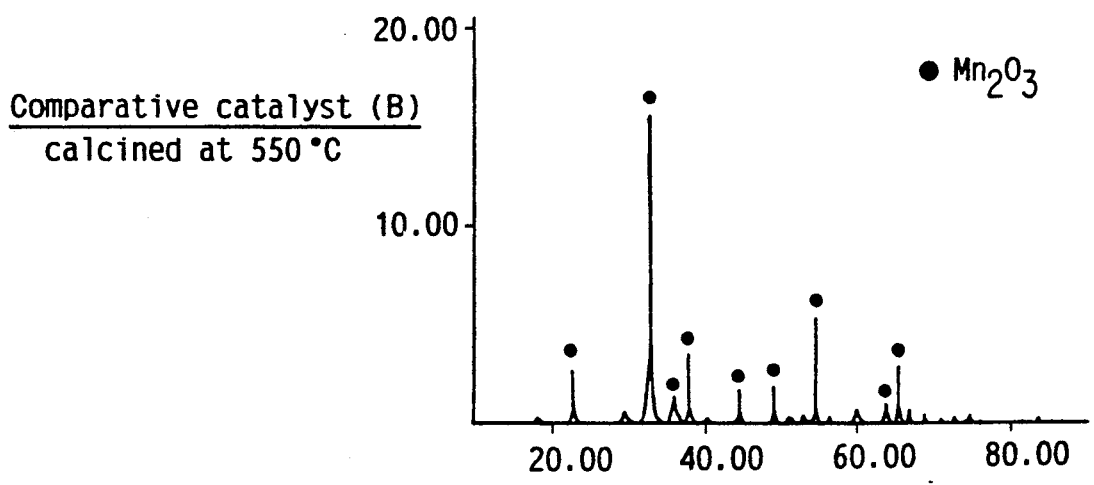

The present inventors have made a study from various aspects on a catalyst that can be used effectively for each of the above-mentioned application uses. Then, it has been found that a catalyst containing at least manganese carbonate as an essential component in a catalyst composition has a high ozone decomposing performance and long working life, as well as that it has high deodorizing performance under the presence of ozone and also excellent in an effect for treating excess ozone.

Further, according to the confirmation of the present inventor, et. al. by experiment, it has been found that the catalyst, particularly, with a catalyst composition containing manganese carbonate applied with a heat treatment in an oxidative atmosphere at 100°–420° C. and also containing $MnO_x$ (where $x=1.6-2.0$) in addition to manganese catalyst has an extremely high catalyst performance as described above.

The catalyst according to the present invention has one of preferred features of containing $MnO_x$ in addition to manganese carbonate and the structure still has a crystal peak of manganese carbonate when put to X-ray diffractiometry as shown by spacing of lattice plane (d value) shown in Table 1.

TABLE 1

| Spacing of lattice plane (d value) | Relative intensity |
|---|---|
| 3.66 | Intense |
| 2.84 | Extreme intense |
| 2.39 | Weak |
| 2.17 | Weak |
| 2.00 | Weak |
| 1.77 | Weak |
| 1.76 | Intense |
| 1.53 | Weak |

When manganese carbonate is applied with a heat treatment in an oxidative atmosphere such as an air atmosphere or oxygen-excessive atmosphere, decomposition starts gradually about at 100° C. and manganese carbonate disappears completely at a temperature higher than 450° C. On the other hand, manganese oxide formed by decomposition of manganese carbonate has a crystal form of $MnO_x$ (in which $x=1.6-2.0$) between 100°–420° C. and it transforms into $Mn_2O_3$ and, further, into $Mn_3O_4$ at a temperature higher than 420° C. $MnO_x$ (in which $x=1.6-2.0$) has an ozone decomposing performance and/or ozone deodorizing performance, but $Mn_2O_3$ or $Mn_3O_4$ is inert and has no such catalytic performance.

The present inventor, et. al have considered that the catalyst obtained by applying a heat treatment to a catalyst raw material having manganese carbonate in an oxidative atmosphere at 100°–420° C. and still having a crystal peak of manganese carbonate when measured by x-ray diffractiometry contains a mixture of manganese carbonate and $MnO_x$ (in which $x=1.6-2.0$). Such a catalyst has excellent ozone decomposing performance and/or ozone deodorizing performance, particularly, at low temperature and high humidity condition as compared with a catalyst only composed of $MnO_2$ or other existent catalysts. Further, when manganese carbonate is applied with a heat treatment in an oxygen lacking atmosphere, it maintains a crystal form of manganese carbonate stably up to a high temperature of higher than 500° C. However, manganese carbonate contained in this way by such a heat treatment has no catalyst performance as that of the catalyst obtained by the heat treatment in the oxidative atmosphere as described above.

Upon applying the heat treatment to the catalyst composition containing manganese carbonate in the oxidative atmosphere, it is necessary that the heating temperature is from 100° to 420° C. and a more preferred temperature is from 150° to 400° C. Further, it is desirable that the heating time is from 0.5 to 10 hours and, more preferably, from 1–5 hours. The catalyst obtained by the heat treatment as described above mainly forms $MnO_x$ ($x=1.6-2.0$) of low degree of crystallinity and it is necessary in the present invention that the crystal peak of manganese carbonate is still detected partially upon measurement of X-ray diffractiometry.

Further, for improving the catalyst performance, a catalyst composition may be prepared by adding a transition metal such as Co, Cu, Ni or Ag and a platinum group metal such as Pt, Pd or Rh, as well as an organic materials such as carbon fiber and activated carbon, if necessary, to manganese carbonate, which may be applied with a heat treatment in the same manner as described above in an oxidative atmosphere.

Since the catalyst according to the present invention has an excellent ozone decomposing performance and excellent deodorizing performance, it provides both functions of ozone decomposition and deodorization in a system in which ozone and offensive odor ingredients are present together. Such a performance can be attained by incorporating at least manganese carbonate in the catalyst composition and, if necessary, a catalyst composition containing refractory inorganic oxides such as alumina, silica, titania, zirconia, alumina-silica, alumina-titania, alumina-zirconia, titania-silica, titania-zirconia, titania-silica-zirconia may be formed into a pellet, honeycomb or like other molded catalyst in a customary manner. As the purpose of adding the refractory inorganic oxides, there can be mentioned to uniformly disperse manganese as the active ingredient, cause the refractory inorganic oxides to act as a binder, etc. As the refractory inorganic oxide as described above, one or more of oxides selected from the group consisting of alumina, silica, titania and zirconia may be used alone or in combination and, preferably, those having a specific surface area of greater than 30 m²/g, more preferably, greater than 100 m²/g. Particularly, composite oxides such as $TiO_2$—$SiO_2$, $TiO_2$—$ZrO_2$ and $TiO_2$—$SiO_2$—$ZrO_2$ have excellent deodorizing effect for offensive odors. Further, the refractory inorganic oxides, ceramic monolithic support such as of cordierite and mullite, an inorganic fiber assembly or metal monolithic support may be used as the support, on which a catalyst composition at least containing manganese carbonate may be supported to prepare a supported catalyst. As the metal monolithic support, those of excellent ozone resistance such as aluminum, stainless steel and Fe-Cr-Al alloy are preferred.

There is no particular restriction on the procedures for preparing the catalyst according to the present invention and the following methods (1)-(4) can be mentioned as typical procedures.

(1) A method of adding an organic binder such as polyvinyl alcohol, glycerin, cellulose or an inorganic binder such as alumina sol, silica sol, or manganese nitrate to a catalyst raw material containing manganese carbonate, then molding the same into an appropriate shape such as a pellet or honeycomb by a usual molding method and applying a heat treatment in an oxidative atmosphere to prepare an ozone decomposing catalyst product.

(2) A method of applying a heat treatment to a catalyst raw material containing manganese carbonate in an oxidative atmosphere, adding an organic binder such as polyvinyl alcohol, glycerin or cellulose, or an inorganic binder such as an alumina sol, silica sol or manganese nitrate further, then molding them into an appropriate shape and applying a heat treatment to prepare an ozone decomposing catalyst product.

(3) A method of preparing an aqueous slurry from a catalyst raw material containing manganese carbonate by using a homomixer or the like, coating the same on a ceramic monolithic support such as cordierite or mullite, inorganic fiber assembly such as of alumina or silica, or a metal monothilic support and applying a heat treatment in an oxidative atmosphere to prepare an ozone decomposing catalyst product.

(4) A method of applying a heat treatment to a catalyst raw material containing manganese carbonate in an oxidative atmosphere, preparing the same into an aqueous slurry by using a homomixer or the like, coating them on a ceramic monothilic support such as cordierite or mullite or inorganic fiber assembly such as of alumina or silica or metallic monolithic support and applying a heat treatment to prepare an ozone decomposing catalyst product.

EXAMPLE

Description will be made more specifically to the present invention by way of examples. However, it should be noted that the present invention is not restricted by such examples.

EXAMPLE 1

After adding 0.5 kg of an alumina sol ($AlO_3$ content: 30 wt %) to 10 kg of manganese carbonate, further adding an appropriate amount of water and mixing them sufficiently in a kneader, they were thoroughly kneaded in a kneader and then a homogeneous kneading product was extrusion molded to prepare a lattice honeycomb of 50 mm height, 50 width and 50 mm length of an outer sizes (wall thickness: 0.3 mm, opening: 1.4 mm), which was dried at 150° C. for 5 hours and, subsequently, calcined at 250° C. for 2 hours in an air atmosphere to obtain a catalyst (1).

EXAMPLE 2

A catalyst (2) was obtained in the same procedures as those in Example 1 except for calcining the drying product of the lattice honeycomb in Example 1 at 350° C. for 2 hours.

COMPARATIVE EXAMPLE 1

A comparative catalyst (A) was obtained in the same procedures as those in Example 1 except for calcining the drying product of the lattice honeycomb in Example 1 at 450° C. for 2 hours.

COMPARATIVE EXAMPLE 2

A comparative catalyst (B) was obtained in the same procedures as those in Example 1 except for calcining the drying product of the lattice honeycomb in Example 1 at 550° C. for 2 hours.

EXAMPLE 3

A catalyst was prepared as below.

At first a composite oxide comprising titanium and silica was prepared by the procedures described below.

An aqueous ammonia solution was gradually dropped into an aqueous mixed solution of titanium tetrachloride and silica sol (Snowtex: NCS-30 manufactured by Nissan Chemical Co.) to form a coprecipitate gel of titanium and silica.

After filtering and water washing the thus obtained gel, it was dried at 200° C. for 10 hours and calcined in an air atmosphere at 550° C. 6 hours to obtain a composite oxide powder of $TiO_2$-$SiO_2$ (hereinafter referred to as a TS powder). The TS powder had a BET surface area of 150 m²/g and a composition of $TiO_2/SiO_2=4/1$ (molar ratio). 0.2 kg of slightly crystalline cellulose (Avicell: manufactured by Asahi Kasei Industry Co.) was added together with an appropriate amount of water to 10 kg of the thus obtained TS powder, mixed thoroughly in a kneader and further kneaded. Then, it was extrusion molded in the same manner as in Example 1 and then dried and calcined to obtain a honeycomb molding product. Then, while dissolving 50 g of an alumina sol ($Al_2O_3$ content: 30 wt %) in 4 liter of water and sufficiently stirring in a homomixer, 1000 g of manganese carbonate was added to prepare a slurry. After coating the molding product with the thus obtained slurry, removing an excess slurry by pressurized air and drying at 150° C., it was calcined in an air atmosphere at 400° C. for 2 hours to obtain a catalyst (3).

EXAMPLE 4

Manganese carbonate was applied with a heat treatment in a rotary kiln in air atmosphere at 400° C. for 2 hours and a catalyst (4) was obtained in the same procedures as those in Example 3 except for using the thus heat-treated manganese carbonate instead of manganese carbonate in Example 3.

COMPARATIVE EXAMPLE 3

A honeycomb molding product obtained in the same procedures as those in Example 3 was immersed in an aqueous solution of manganese nitrate (20 wt % as $MnO_2$), dried after removal of an excess solution and, subsequently, calcined at 400° C. for 2 hours to obtain a comparative catalyst (C).

EXAMPLE 5

After preparing a lattice honeycomb in the same procedures as those in Example 1 from a mixture comprising 5 kg of TS powder, 7.2 kg of manganese carbonate and 0.8 kg of silica sol ($SiO_2$ content: 20 wt %) and drying at 150° C. for 5 hours, a catalyst (5) was obtained by calcining in an air atmosphere at 350° C. for 2 hours.

EXAMPLE 6

A catalyst (6) was obtained in the same procedures as those in Example 5 except for using 5 kg of an activated alumina having a BET surface area of 120 m²/g instead of the TS powder in Example 5.

EXAMPLE 7

After preparing a lattice honeycomb in the same procedures as those in Example 1 from a mixture comprising 3 kg of TS powder, 10 kg of manganese carbonate and 2.5 kg of an aqueous solution of manganese nitrate ($MnO_2$ content: 20 wt %) and drying at 150° C. for 5 hours, a catalyst (7) was obtained by calcining in an air atmosphere at 350° C. for 2 hours.

COMPARATIVE EXAMPLE 4

A lattice honeycomb was prepared in the same procedures as those in Example 1 from a mixture comprising 5 kg of anatase type titania with a BET surface are of 120 m²/g, 5 kg of electrolysis manganese dioxide and 1.5 kg of titania sol ($TiO_2$ content: 10 wt %) and dried at 150° C. for 5 hours, which was then calcined in an air atmosphere at 350° C. for 2 hours to obtain a comparative catalyst (D).

EXAMPLE 8

Ozone decomposing test was conducted for the catalysts in Examples 1-7 and Comparative Examples 1-4. Table 2 shows the result of the test for the ozone decomposing efficiency at the initial stage and after 100 hours. The catalysts according to the present invention maintained high ozone decomposing performance for a long period of time even under a relatively low temperature and high humidity condition at a gas temperature of 25° C. and a relative humidity of 80%. Further, an ozone decomposing test and an offensive odor gas removing test were conducted for the catalysts in Examples 5-7 and Comparative Example 4. Table 3 shows the result of the test 24 hours after starting the reaction. The catalyst according to the present invention had both high ozone decomposing performance and excellent offensive odor eliminating performance even under a relatively low temperature and high humidity condition at a gas temperature of 25° C. and a relative humidity of 80%.

TABLE 2

| Catalyst | | Ozone decomposition efficiency (%) | |
|---|---|---|---|
| | | Initial | After 100 hrs |
| Example 1 | $MnCO_3$ (calcining temperature 250° C.) | 85 | 76 |
| Example 2 | $MnCO_3$ (calcining temperature 350° C.) | 95 | 88 |
| Comp. Example 1 | $MnCO_3$ (calcining temperature 450° C.) | 83 | 65 |
| Comp. Example 2 | $MnCO_3$ (calcining temperature 550° C.) | 77 | 38 |
| Example 3 | $MnCO_3$ coat/($TiO_2$-$SiO_2$) | 91 | 85 |
| Example 4 | $MnCO_3$ calcining product coat/($TiO_2$-$SiO_2$) | 90 | 83 |
| Comp. Example 3 | $Mn(NO_3)_2$ impregnation/ ($TiO_2$-$SiO_2$) | 83 | 29 |
| Example 5 | $MnCO_3$ + ($TiO_2$-$SiO_2$) | 92 | 85 |
| Example 6 | $MnCO_3$ + ($\gamma$-$Al_2O_3$) | 91 | 84 |
| Example 7 | $MnCO_3$ + ($TiO_2$-$SiO_2$) | 88 | 85 |
| Comp. Example 4 | Electrolysis $MnO_2$ + $TiO_2$ | 75 | 21 |

Evaluation condition:
Space velocity SV = 200,000 hr$^{-1}$
Gas temperature: 25° C.,
Inlet ozone concentration: 1.0 ppm,
Relative humidity: 80%

EXAMPLE 9

X-ray diffractiometry was measured using Cu°Kα for the catalysts (1)-(5) in the respective examples and, as a result, it was confirmed that each of the catalysts had an spacing of lattice plane (d value) of 3.66, 2.84 and 1.76 as the features of manganese carbonate and also had an amorphous manganese oxide ($MnO_x$) of low degree of crystallinity. Further, as a result of measurement for X-ray diffractiometry conducted on the comparative catalysts (A), (B) obtained in respective comparative examples, it was found that each of the comparative catalysts predominantly had a crystal peak of manganese oxide ($Mn_2O_3$) and had no crystal peak of manganese carbonate.

TABLE 3

| Catalyst | | Catalyst performance (24 hrs after starting reaction) | |
|---|---|---|---|
| | | Ozone decomposing efficiency | Offensive odor gas removing efficiency |
| Example 5 | $MnCO_3$ + ($TiO_2$-$SiO_2$) | 100% | 98% |
| Example 6 | $MnCO_3$ + ($\gamma$-$Al_2O_3$) | 98% | 97% |
| Example 7 | $MnCO_3$ + ($TiO_2$-$SiO_2$) | 98% | 95% |
| Comp. Example 4 | Electrolysis $MnO_2$ + $TiO_2$ | 85% | 78% |

Evaluation condition:
Inlet offensive odor gas ($H_2S$) concentration: 5 ppm,
Inlet ozone concentration: 15 ppm,
Space velocity SV = 30,000 hr$^{-1}$,
Gas temperature: 25° C.,
Relative humidity: 80%

FIG. 1(a), (b), (c) and (d) shows the result of X-ray diffractiometry using Cu Kα on catalysts (1), (2) obtained in Examples 1-2 and comparative catalysts (A), (B) obtained in Comparative Examples 1-2. From the result, it can be considered as below. As the calcining temperature of manganese carbonate is elevated, the XRD peak of $MnCO_3$ is reduced. That is, it is considered that $CO_2$ is formed upon decomposition of $MnCO_3$ to form manganese oxide but the peak of manganese oxide is scarcely observed and a slight peak near $MnO_2$ is detected upon XRD measurement. The present inventors, et al consider that the peak corresponds to amorphous $MnO_x$.

We claim:

1. An ozone decomposing catalyst for catalytically decomposing ozone contained in a gas and/or an ozone deodorizing catalyst for catalytically and oxidatively decomposing offensive odor ingredients due to the presence of ozone, consisting essentially of manganese carbonate further containing $MnO_x$, wherein x is 1.6 to 2.0.

2. A catalyst as defined in claim 1, which further contains a refractory inorganic oxide.

3. A catalyst as defined in claim 2, wherein the refractory inorganic oxide is selected from one or more of alumina, silica, titania and zirconia.

4. A method of preparing a catalyst as defined in claim 1, wherein a catalyst raw material consisting essentially of manganese carbonate is heat treated in an oxidative atmosphere at 100°–420° C.

5. A method of preparing a catalyst as defined in claim 4, wherein a catalyst raw material consisting essentially of manganese carbonate and a refractory inorganic oxide is heat treated.

6. A catalyst as defined by claim 1, prepared by heat treating a catalyst raw material consisting essentially of manganese carbonate in an oxidative atmosphere at 100°–420° C.

7. A catalyst as defined by claim 6, wherein the heat treating is at 150°–400° C.

8. A method for preparing a catalyst as defined by claim 4, wherein the heat treating is at 150°–400° C.

* * * * *

UNITED STATES PATENT AND TRADEMARK OFFICE
CERTIFICATE OF CORRECTION

PATENT NO.   : 5,296,435
DATED        : March 22, 1994
INVENTOR(S)  : Shinya KITAGUCHI, et al.

It is certified that error appears in the above-indentified patent and that said Letters Patent is hereby corrected as shown below:

On the title page, Item [54] and Column 1, Line 2, the title should read as follows:

--CATALYST AND A METHOD OF PREPARING THE CATALYST--

Signed and Sealed this

Fifth Day of July, 1994

*Attest:*

BRUCE LEHMAN

*Attesting Officer*  *Commissioner of Patents and Trademarks*